(12) United States Patent
Fisher et al.

(10) Patent No.: US 6,281,877 B1
(45) Date of Patent: Aug. 28, 2001

(54) CONTROL INTERFACE

(75) Inventors: Kim J Fisher, Ipswich; David J Linton, Woodbridge, both of (GB)

(73) Assignee: British Telecommunications plc, London (GB)

( * ) Notice: Subject to any disclaimer, the term of this patent is extended or adjusted under 35 U.S.C. 154(b) by 0 days.

(21) Appl. No.: 09/029,576
(22) PCT Filed: Mar. 27, 1997
(86) PCT No.: PCT/GB97/00872
§ 371 Date: Mar. 6, 1998
§ 102(e) Date: Mar. 6, 1998
(87) PCT Pub. No.: WO97/37294
PCT Pub. Date: Oct. 9, 1997

(30) Foreign Application Priority Data

Mar. 29, 1996 (GB) .................................. 9606791

(51) Int. Cl.[7] ........................................ G09G 5/08
(52) U.S. Cl. .................. 345/145; 345/121; 345/419; 345/427
(58) Field of Search .................. 345/427, 419, 345/429, 145, 149, 421, 121, 131

(56) References Cited

U.S. PATENT DOCUMENTS

| | | | |
|---|---|---|---|
| 4,812,829 | * 3/1989 | Ebina et al. | 345/159 |
| 5,276,785 | * 1/1994 | Mackinlay et al. | 345/427 |
| 5,333,254 | * 7/1994 | Robertson | 345/356 |
| 5,359,703 | * 10/1994 | Robertson et al. | 395/119 |
| 5,680,524 | * 10/1997 | Maples et al. | 395/127 |
| 5,689,628 | * 11/1997 | Robertson | 345/427 |
| 5,808,613 | * 9/1998 | Marrin et al. | 345/429 |
| 5,812,142 | * 9/1998 | Small et al. | 345/438 |
| 5,956,028 | * 9/1999 | Masui et al. | 345/329 |

FOREIGN PATENT DOCUMENTS

| | | | |
|---|---|---|---|
| 0 471 484 A2 | * | 2/1992 | (EP) . |
| 0 469 923 A2 | * | 5/1992 | (EP) . |
| 94/08309 | * | 4/1994 | (WO) . |

OTHER PUBLICATIONS

Robertson, George; Card, Sturart K. and Mackinlay, Jock D.; "Information Visualization using 3D Interactive Animation", Communications of the ACM, vol. 36, No. 4, Apr. 1993.*

* cited by examiner

Primary Examiner—Dennis-Doon Chow
(74) Attorney, Agent, or Firm—Nixon & Vanderhye P.C.

(57) ABSTRACT

A control interface for a data terminal includes a three-dimensional display of an environment which includes a number of objects. Different objects correspond to different data sources. The apparent location of the viewpoint in the environment is changed in response to input from the user. In response to the selection of a destination object by the user, the viewpoint moves from a current location to the location of the destination object gradually via a series of intermediate locations. The speed with which the viewpoint moves is progressively reduced as the destination object is approached. The speed may also be further reduced if the direction of gaze of the viewpoint is moved by the user away from the destination object during the flight. As an alternative to direct selection of the destination object, the user may select a vehicle object to take the viewpoint to a predetermined location.

11 Claims, 5 Drawing Sheets

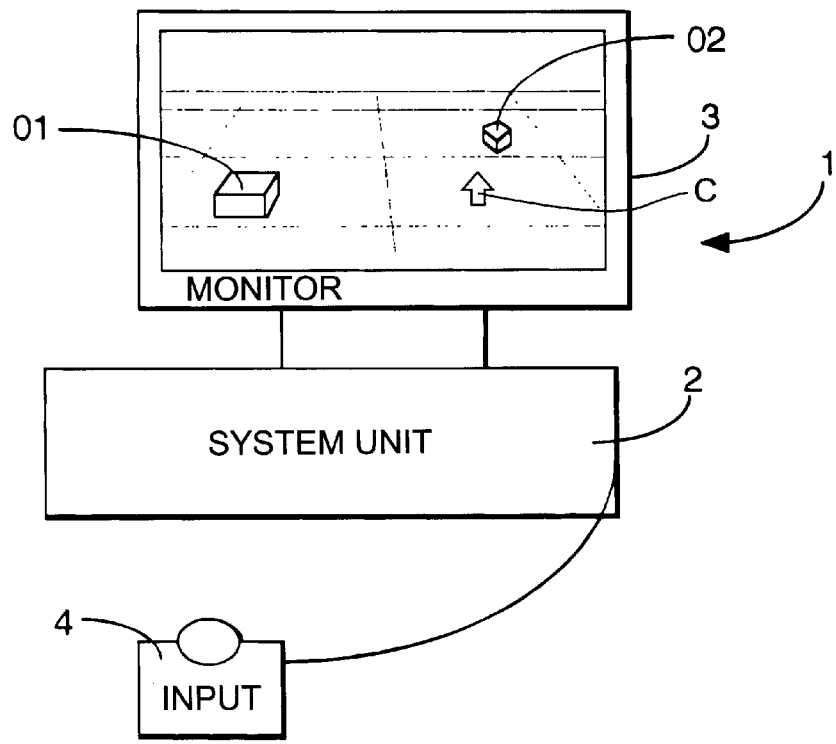
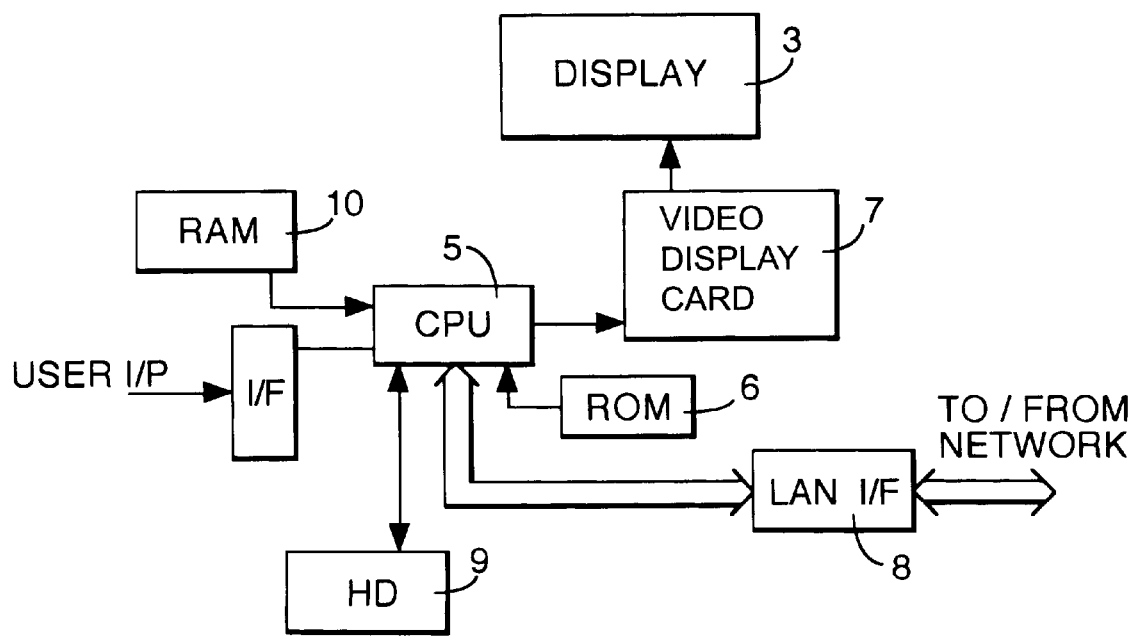

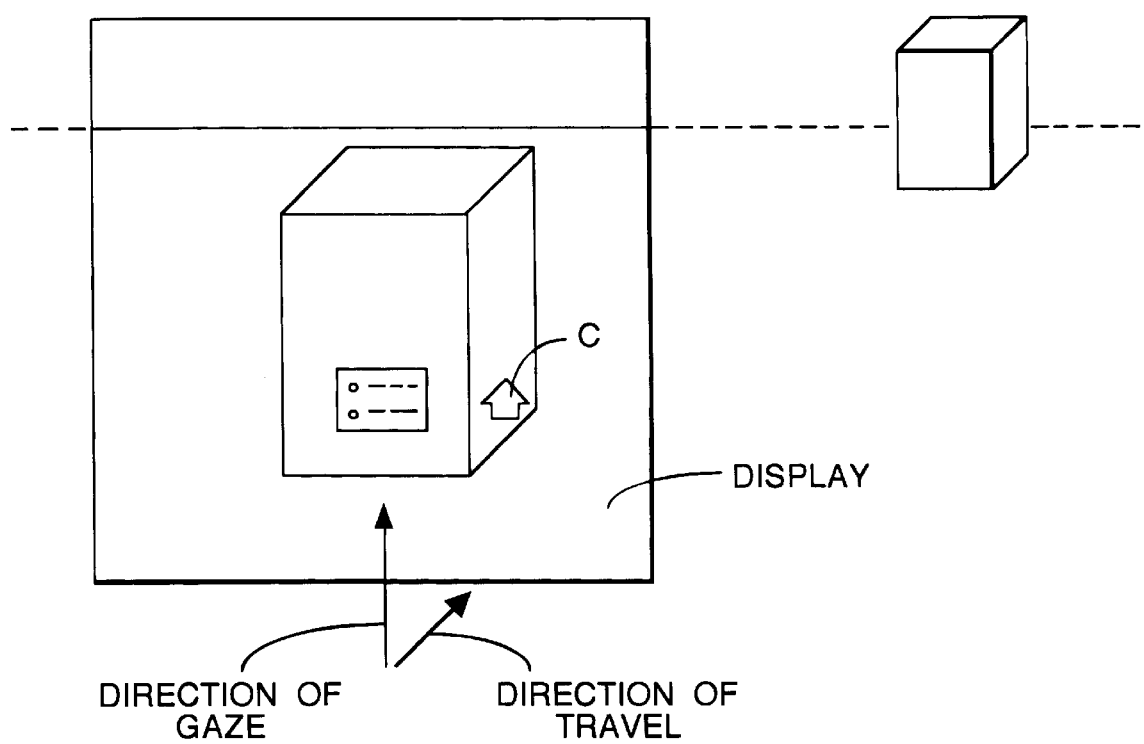

CONTROL INTERFACE

BACKGROUND OF THE INVENTION

1. Field of the Invention

The present invention relates to a control interface for a data terminal such as a personal computer connected to a network.

2. Related Art

Developments in telecommunications and computing, such as the growth of the Internet, potentially make available to users a large and diverse universe of data. It is important therefore that any data terminal is designed in such a way as to facilitate efficient browsing, selection and retrieval of data. It has long been recognised that the nature of the user interface makes an important contribution to the operational efficiency of any such terminal. User interfaces have developed from simple text-based command line interfaces to two-dimensional graphic user interfaces (GUI's) such as those associated with the industry-standard operating systems of Apple Computers, Microsoft and others. In two-dimensional GUI's data are commonly displayed and accessed in a tree structure using a file and folder metaphor. As the size and complexity of the available data increases, such an approach becomes increasingly inadequate.

It has recently been proposed to use interfaces based on a three-dimensional display and control environment. In such an environment, a data source—which may be, for example a file on a local storage device, a remotely located file, or a live data source such as an on-line news service—is typically represented as a three-dimensional object in a landscape. The visual characteristics of the object may be used to identify the type of data, and the relative positions of different objects may be used to map relationships between the data. The user traverses the landscape and interacts with the data using an input device such as a mouse.

The use of a three-dimensional interface provides additional ways of indicating to the user relationships between data, and opens up the possibility of a variety of new forms of interaction between the user and the terminal. It is found however that the greater complexity of the 3-D interface can easily exacerbate the demands placed on the user. Many of the cues which aid human navigation in the real world are missing in the 3-D environment, and the input device used for control of the viewpoint in the environment may be unfamiliar and difficult to use. Slow system response compounds these problems. The user may find that after performing some control action using the input device the viewpoint changes in an unexpected way. The user may end up looking at an unfamiliar or unpopulated part of the environment, with no obvious way of returning to the region containing data sources of interest. In view of these problems, unless the behaviour of the 3-D user interface is appropriately controlled it may reduce rather than increase the efficiency with which the terminal can be used to access data.

SUMMARY OF THE INVENTION

According to a first aspect of the present invention there is provided a control interface for a data terminal comprising a three-dimensional display of an environment including a plurality of objects corresponding to different respective data sources, the apparent location of the viewpoint in the environment being changeable in response to input from the user.

Characterised in that in response to a control input from the user the said viewpoint is arranged to move from a current location to the location of a destination object gradually via a series of intermediate locations and with a speed which is progressively reduced as the destination object is approached.

It will be understood that the term "three-dimensional display" as used herein encompasses any display representing a view with such properties as perspective and parallax. Often such a display will be provided on a conventional two-dimensional screen. The invention also encompasses, but is by no means limited to, immersive virtual reality displays in which a true three-dimensional effect is provided through the use, for example, of a pair of display devices mounted in goggles.

The present invention provides a three-dimensional user interface in which movement between different locations in the environment is effected as a gradual "flight" through a number of intermediate locations with a speed which is reduced as the destination is approached. The inventors have found that this method of changing the viewpoint of the display and so moving between different data sources significantly enhances the intuitiveness and ease of use of the interface, making it easier for the users to orient themselves within the environment and to glean information from the environment. Starting from a relatively higher speed and then progressively slowing means that long flights do not take an undue amount of time, while the slowing of the flight as the target is approached prevents the user becoming disoriented by a rapid approach and sudden stop.

Preferably as the viewpoint moves to the destination object the direction of gaze of the viewpoint is directed towards the object.

In real life, our direction of gaze naturally turns towards an object which is being approached or reached out for. The inventors have found that it is important for this property to be replicated in a 3-D control environment to minimise disorientation of the user as the viewpoint changes.

If when the target object is. initially selected the direction of gaze of the viewpoint is oriented away from the object, then preferably the direction of gaze is changed to face the destination object gradually and concurrently with movement of the viewpoint towards the destination object.

Preferably the direction of gaze of the viewpoint is arranged to be directed away from the target object to another object in the environment in response to a further control input by the user during the flight and at the same time a further discontinuous reduction is made in the speed of travel in addition to the gradual reduction associated with the approach to the destination object.

Preferably while the direction of gaze is directed away from the target object the speed is maintained at a reduced level.

It is found that the interaction of the user with the data via the terminal is further enhanced if during the course of a flight towards an object representing a given data source the user is able to examine other objects along the flight path. To this end, the user is given the ability to change the direction of gaze away from the line of flight while at the same time the speed of flight is reduced, giving the user time to take in information.

The input from the user which initiates the change in location of the viewpoint may take the form of a direct selection of the target object, for example by locating a cursor on the object and clicking on it. Preferably the control interface further comprises vehicle objects displayed in the environment. A vehicle object is arranged, when selected by the user, to take the viewpoint to a predetermined location.

This then provides an alternative way for the user to initiate a change in location. In either case, the user may change the destination before the end of the flight by selecting another object before the original destination object is reached. Such a change might be made if, for example, one of the other objects examined during the course of the flight is found to provide a data source more relevant to the user's needs.

Preferably the interface environment further includes landmark objects not corresponding to data sources.

Often, different regions of the interface environment will contain a number of related data sources. For example, a number of on-line news services might be grouped together in one region. In this case, the user may want to navigate towards the general region but without initially selecting a specific one of the services. This is made possible by the provision of landmark objects which may be selected and used to initiate a change in location in the same way as data objects, but which do not themselves have any associated data source. One or more landmark objects might be provided for each distinct region of the environment, such as the news service region, or landmark objects might be distributed regularly throughout the environment as an aid to navigation through the environment.

Although the use in combination of the features described above is very much to be preferred, they also give advantages when used individually in otherwise conventional interfaces. For example, vehicle objects or landmark objects as defined above may by used in 3-D user interfaces in which movement between locations is achieved other than in accordance with the first aspect of the present invention. The present invention also encompasses a data terminal including a control interface as defined above.

According to a second aspect of the present invention, there is provided a data terminal including processor means, a display device and a user input device, the processor means being arranged to generate and output to the display device a three-dimensional display of an environment including a plurality of objects corresponding to different respective data sources and to change the apparent location of the viewpoint in the environment in response to an input from the user, thereby providing a control interface for the terminal, characterised by means for moving the viewpoint from a current location to the location of a destination object gradually via a series of intermediate locations and with a speed which is progressively reduced as the destination object is approached.

According to a further aspect of the present invention, there is provided a control interface for a data terminal, the control interface comprising a three-dimensional display of an environment which includes a plurality of objects corresponding to different respective data sources, in which:

the apparent location of the viewpoint in the environment is arranged to move, in response to a control input from the user, from a current location to the location of a destination object gradually, via a series of intermediate locations, and with a speed which is progressively reduced as the destination object is approached;

the direction of gaze of the viewpoint is arranged to be directed away from the destination object towards another object in the environment in response to a further control input made by the user during flight of the viewpoint; and at the same time, in response to the said further control input, a discontinuous reduction is made in the speed of travel in addition to the progressive reduction associated with the approach to the destination object.

The invention also encompasses methods of controlling data terminals.

BRIEF DESCRIPTION OF THE DRAWINGS

Systems embodying the present invention will now be described in further detail, by way of example only, with reference to the accompanying drawings in which:

FIG. 1 is a front elevation of a data terminal embodying the present invention;

FIG. 2 is a schematic of the terminal of FIG. 1;

FIG. 5 is a frame of a further display generated by the interface; and

DETAILED DESCRIPTION OF EXEMPLARY EMBODIMENTS

Figure 3A:
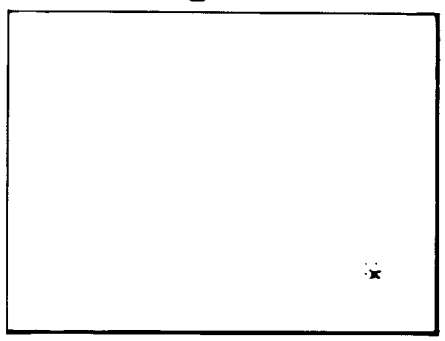
FIGS. 3A to 3G are frames of a display generated by the interface.
Figure 3B:
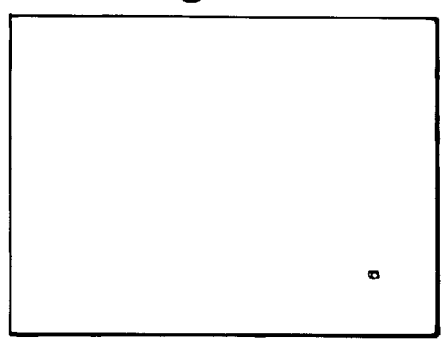
Figure 3C:
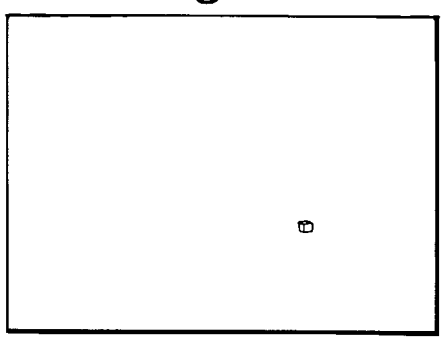
Figure 3D:
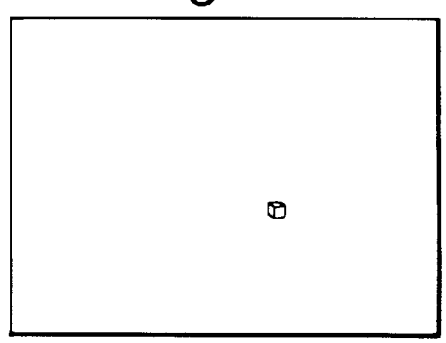
Figure 3E:
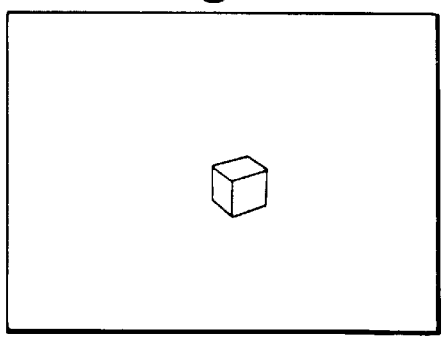
Figure 3F:
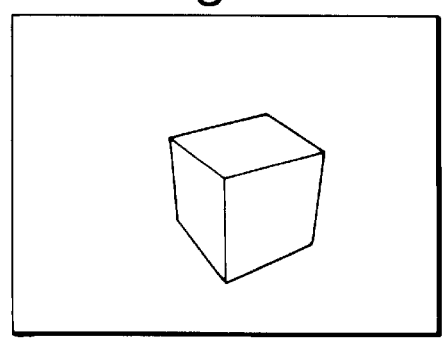
Figure 3G:
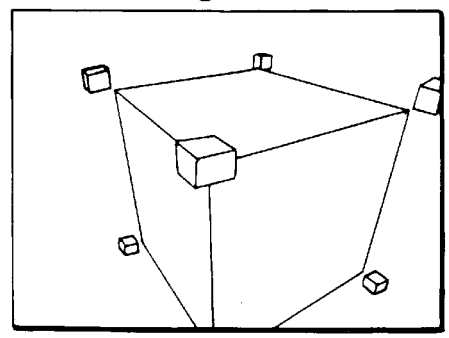
Figure 4A:
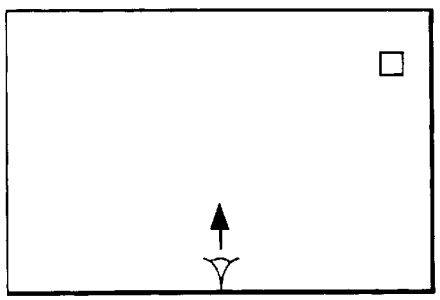
FIGS. 4A to 4G are plan views showing the relationship between the viewpoint and the destination object at instants corresponding to the frames of FIG. 2.
Figure 4B:
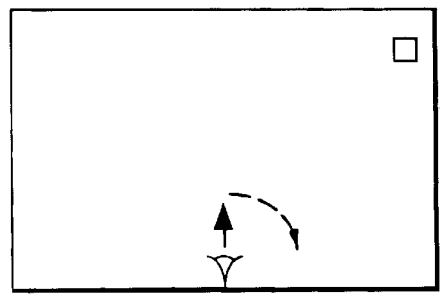
Figure 4C:
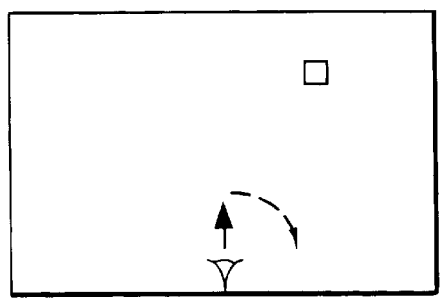
Figure 4D:
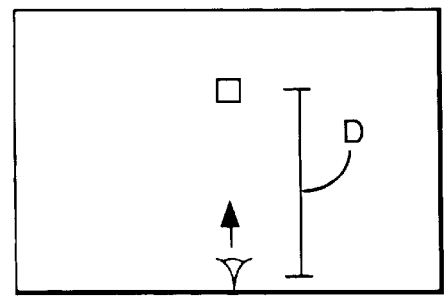
Figure 4E:
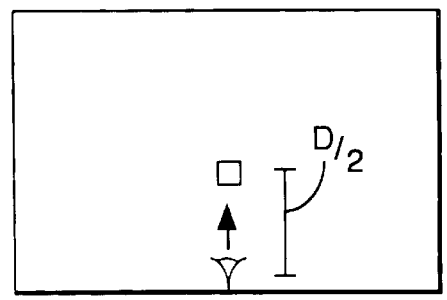
Figure 4F:
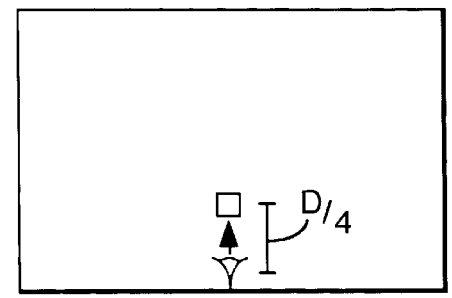
Figure 4G:
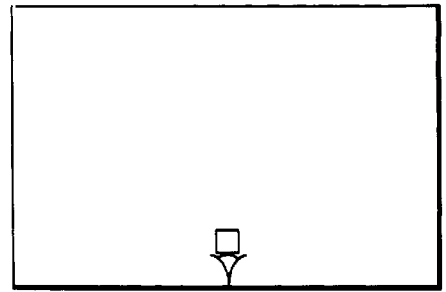

A data terminal 1 comprises a system unit 2, a monitor 3 and a user input device 4. In the present example, the user input device 4 is a track-ball having six degrees of freedom. Alternatively two mice may be used as the input devices. In this case one mouse is a so-called space-ball which moves in 3 dimensions and controls the movement of the viewpoint. The other mouse is a conventional 2D input device and is used for clicking on objects in the environment to select them. The system unit 2 is connected to a local area network. The LAN may include a server (not shown) providing a TCPIIP connection to the Internet. The system unit 2 generates and displays on the monitor 3 a perspective view of a three-dimensional environment in which different data sources are represented as objects O1, O2 in the environment. A cursor C is also displayed on the monitor 3.

FIG. 2 shows in further detail the components making up the terminal 1. A central processor unit (CPU) 5 runs the terminal's operating systems. Suitable processors include the Motorola PowerPC 601 or Mips R4600PC The CPU is connected via an appropriate interface 8 to the LAN. In addition, the CPU accesses local data stored on a mass storage device 9 and in random access memory 10. The operating system for the terminal is stored in ROM 6. This includes OS subsystems for implementing the graphical elements of the user interface. Using these subsystems the CPU 5 and video display card 7 generate a display which is output to the monitor 3.

In use, the position of the trackball 4 is returned to the CPU 5. The values returned are interpreted by the operating system, and any change is converted into a corresponding movement of the cursor C on the display. To access a data source such as that represented by object O2, the track ball 4 is used to manipulate the cursor C to locate it at the object O2. A double-click operation is performed to select the object. The operating system then initiates a transition or flight to the selected object, as described further below. At the same time, the CPU 5 prepares to access the data source associated with the object.

FIGS. 3A to 3G are successive frames separated by uniform time intervals illustrating the manner in which the user interface changes the view presented to the user during the flight to the selected object. FIGS. 4A to 4G are plan views showing the relative location of the viewpoint and of the destination object at corresponding times.

FIG. 3A Shows the view of the object prior to its being selected. The direction of gaze, shown by the arrow in FIG.

4a, is angled away from the object by some 30 degrees. 3B Shows the cursor located at the object as the user selects it. The direction of gaze of the viewpoint then begins to turn towards the selected object at the same time as the viewpoint is slowly translated towards the object. In frame 3C, the angle of the direction of gaze has changed to approximately 15 degrees from the object. By frame 3D, the direction of gaze is substantially aligned with the target object which is separated from the viewpoint by distance D, and at this point the speed of translation towards the object is increased. In the following frames, the distance between the viewpoint and the object is halved in each successive frame, so that the object is approached with a progressively diminishing speed. In frame 3G, the distance between the viewpoint and the object has fallen below a minimum threshold and the viewpoint is treated as having arrived at the object. The movement of the viewpoint then stops. In response to the arrival at the object, the CPU accesses the relevant data source and displays it to the user. The initial display might comprise, for example, a menu of items available in the data source. This menu might be displayed on or inside the object within the three-D environment. Alternatively, arrival at the object might trigger a switch to an alternative display, for example a two-dimensional full-screen window. When the object is one having the property that it allows the user to enter it, for example to access menus displayed on its inner surfaces, then the walls of the object are arranged to become translucent as seen from the viewpoint inside the object. This enables the user to access the additional displays associated with the inside of the object, while maintaining their sense of place in the surrounding world. As well as enabling selection of subsets of data associated with the data object, the menus displayed inside the object may include links to other data sources. In this case the object acts as a transporter, and selection of an appropriate menu item results in the viewpoint being translated to a different location in the environment, or to an alternative environment.

During the flight towards a destination object, the user may scan the environment and view and/or select other objects in the environment. In the example shown in FIG. 5, the initial flight takes place as shown in the first four frames of FIG. 3. However then a further object comes into view. The user then turns the direction of gaze of the viewpoint towards the further object by moving the cursor to using the track ball. At the same time as the direction of gaze moves away from direction of travel towards the destination object, the speed of movement of the viewpoint towards the object is curtailed to a low fixed level. The direction of gaze remains turned towards the further object, as shown in FIG. 5, for as long as that object is selected by the user holding down the track ball button while locating the cursor at the object. In this example, the further object is an on-line news service including headlines displayed on the outer surface of the object. After browsing these headlines the user may choose the on-line news object as a new destination object by double clicking. Alternatively, the user may release the track ball button. In response to this the operating system turns the direction of gaze of the viewpoint back to the original destination object, increases the speed of travel to the object, and completes the flight to the destination object in the manner described previously with respect to FIG. 3.

Figure 6A:
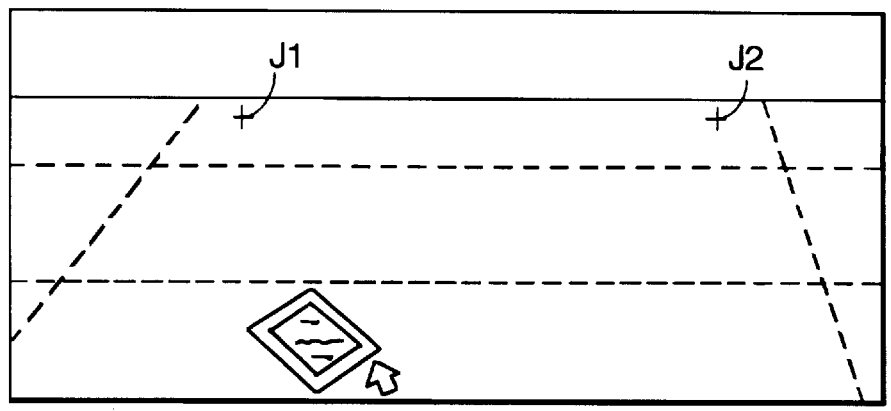
FIGS. 6A to 6C are frames of the display generated by the interface following selection of a vehicle object.
Figure 6B:
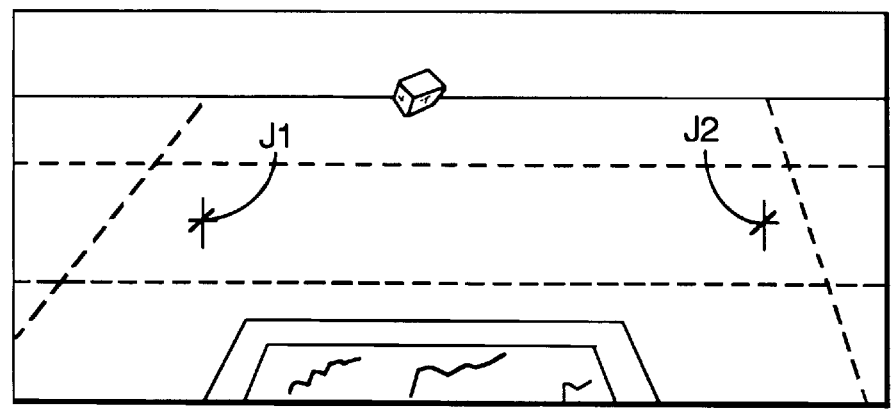
Figure 6C:
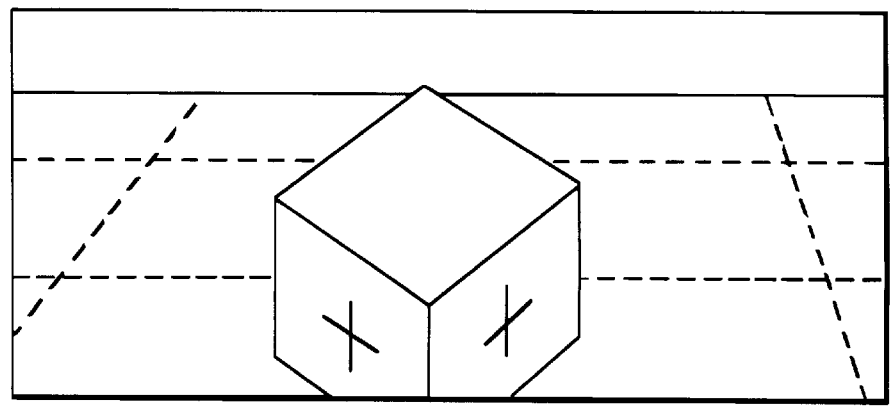

In the presently described example, the operating systems provides a further alternative method of selecting and accessing data sources. This uses vehicle objects which carry the viewpoint to a predetermined location. The user then does not have to select the destination directly, but instead first selects the vehicle object. In example shown in FIGS. 6a to 6c, the vehicle object is represented graphically as a flying carpet. The viewpoint is first moved to the vehicle object and the vehicle object and viewpoint then move towards a predetermined destination object associated with the vehicle object. In the example shown in FIG. 6A–6C this is a data source which was out of sight over the horizon in the starting position of the viewpoint. Also shown in FIG. 6A–6C are certain landmark objects J1, J2. These do not have any corresponding data source, but nonetheless may be selected by the user as a destination to aid navigation through the environment.

Table 1 below lists code for use in implementing the user interface described above. In this example, the interface is coded using a commercially available language designed for the manipulation of three-dimensional environments known as SCL. It will be understood that this SCL implementation is described by way of example only, and other implementations are possible. For example, the control/display environment might be constructed using VRML (virtual reality mark-up language) tools such as those contained in the Open Inventor tool kit available commercially from Silicon Graphics Inc. of Mountain View, Calif., USA. Also, at least part of the operations making up the user interface may be implemented in hardware. For example, a graphic processor chip included in the video card 7 may implement in hardware certain primitive operations of the interface such as the 3-D scrolling of the environment as the viewpoint moves.

TABLE 1

Object 'eye'.

This code demonstrates navigation in VR space.

If the object number of a target object is put in t, I will 'fly' the viewpoint to near the target and set t to me, a second assignment of the target object number to t will take the viewpoint inside the target (where object-specific code can be invoked). (Note: if the viewpoint is already 'close' to me on the first assignment of the target object number to t, the viewpoint will fly directly inside the target without halting.)

Flight is fastest at the start of the flight and slows down as the target object is approaching. The speed of flight is also slower when the viewpoint is NOT directed towards the target. This ensures that viewpoint rotations are completed before the target is reached and the user is not disoriented by excessive sideways flying.

Flight may be stopped at any time by setting t to me (usually by hitting the space bar).

The code will respond correctly if the target moves or changes size while I am controlling the viewpoint.

This code relies on my child object 'eyeball' and the viewpoint. I am coupled to 'eyeball'. The viewpoint must be attached to 'eyeball' and control 'eye' and have mode View No Z 5. When I the attached viewpoint moves with me. I rotate the viewpoint by changing xvroff and yvroff.

Objects may test 'eye' t to see if they have 'possession' of the viewpoint. This allows objects to avoid unwanted execution of their object-specific code when the viewpoint flies through them on the way to another object. If no object has possession of the viewpoint, t is to 'eye'.

Local variables used as constants are:

dr controls how close we get to the target before halting flight. (The actual close distance is sqrt(dr)$^x$max(x size(me), y size(me), z size(me))).

v controls speed of flight (decreasing v makes flight faster)—it's the fraction of the distance to be moved towards the target per SCL execution loop.

TABLE 2 va controls how quickly viewpoint turns to face me (decreasing va makes viewpoint turn more quickly)·it's the fraction of the angle to be turned to make the
viewpoint face the target per SCL excution loop.
Note: do NOT declared any variables before the declartion
of t otherwise other objects will not assign values to it
correctly!
*/
objum t, tp;
char close, flyto, lookat;
fixed ae, ye;
float c, cae, cye, d, dc, dn, dr=2.250000, v=30.00000,
    va=20.000000, x, y, z;
if (first)
{
  t=me;
  tp=me;
}
if (t!=me)
{
  /*we've got a target, look at it and fly to it */
  x=x view·xpos (t)·xsize (t)/2;
  y=y view·ypos (t)·ysize (t)/2;
  z=z view·zpos (t)·zsize (t)/2;
  d=x$^x$x+y$^x$y+z$^x$z;
  dn=xsize (t);
  if (dn<ysize (t))
      dn=zsize (t);
  if (dn=zsize (t))
      dn=zsize (t);
  dc=dn$^x$dn$^x$dr;
  if (t!=tp)
  {
    /*we've been given new target, reset close */
    tp=t;
    close=d<dc;
  }
  ye=yvroff+y rot ('eyeball')·atn (x, −z);
  if (ye>=180)
      ye=ye—360;

TABLE 3
  else
  {
    if (ye<·180)
        ye =ye+360;
  }
  ae=xvroff+xrot ('eyeball')·atn (y, sqrt (z$^x$z+x$^x$x));
  if (ae>=180)
      ae=ae·360;
  else
  {
    if (ae<·180)
        ae=ae+360;
  }
  lookat=ye>3 || ye<·3 || ae>3 || ae<·3;
  if (lookat)
  {
    /* rotate.viewpoint to face target */
    yvroff=yvroff·ye/va;
    xvroff=xvroff·ae/va;
  }
  if (close)
      flyto=16$^x$d>dc;
  else
  {
      flyto=d>dc;
  } if (!flyto)
      close=true;
}
if (flyto)
{
  /* move viewpoint towards target */
  cae=abs (cos (ae/2))/16384.0000;
  cye=abs (cos (ye/2))/16484.0000;
  c=cae$^x$cye/v;
  xpos (me)=xpos (me)·x$^x$c;
  ypos (me)=ypos (me)·y$^x$c;
  zpos (me)=zpos (me)·z$^x$c;
}
else
{
    /* I've arrived·stop engines!*/
    t=me;
    tp=me;
}
{

TABLE 4
/* Code required for object in the VR environment to enable
it to be clicked on and flown to */
    if (activate (me, O))
        'eye'.t=me;
What is claimed is:

1. A control interface for a data terminal, the control interface comprising a three-dimensional display of an environment which includes a plurality of objects corresponding to different respective data sources, in which:
the apparent location of the viewpoint in the environment is arranged to move, in response to a control input from the user, from a current location to the location of a destination object gradually, via a series of intermediate locations, and with a speed which is progressively reduced as the destination object is approached;
the direction of gaze of the viewpoint is arranged to be directed away from the destination object towards another object in the environment in response to a further control input made by the user during flight of the viewpoint; and
at the same time, in response to the said further control input, a discontinuous reduction is made in the speed of travel in addition to the progressive reduction associated with the approach to the destination object.

2. A control interface according to claim 1, in which the direction of gaze of the viewpoint is arranged to turn towards the destination object selected by the user.

3. A control interface according to claim 2, in which, when the direction of gaze is initially oriented away from the object, the direction is turned to face the destination object gradually and concurrently with movement of the viewpoint towards the destination object.

4. A control interface according to claim 3, in which the speed of movement of the viewpoint towards the destination object is maintained at a first relatively lower value while the direction of gaze is oriented away from the object, and increases to a second relatively higher value when the direction of gaze is oriented towards the object.

5. A control interface according to claim 1, further comprising vehicle objects displayed in the interface environment and arranged, when selected by the user, to take the viewpoint through a series of intermediate locations to the location of a predetermined destination object.

6. A control interface according to claim 1 including landmark objects as defined herein displayed in the interface environment.

7. A data terminal including a control interface according to claim 1.

8. A control interface for a data terminal comprising a three-dimensional display of an environment including a plurality of objects corresponding to different respective data sources, the apparent location of the viewpoint in the environment being changeable in response to an input from the user, wherein in response to a control input from the user, the said viewpoint is arranged to move from a current location to the location of a destination object gradually via a series of intermediate locations and with a speed which is progressively reduced as the destination object is approached, in which the direction of gaze of the viewpoint is arranged to be directed away from the target object towards another object in the environment in response to a further control input by the user during the flight, and at the same time a further discontinuous reduction is made in the speed of travel in addition to the gradual reduction associated with the approach to the destination object.

9. A control interface according to claim 1, in which while the direction of gaze is directed away from the target object the speed of approach is maintained at a substantially constant reduced level.

10. A data terminal including
a) a display device;
b) a user input device; and
c) processor mean which are arranged
  i) to generate and output to the display device a three-dimensional display of an environment including a plurality of objects corresponding to different respective data sources and to change the apparent location of the viewpoint in the environment in response to an input from the user via the user input device, thereby providing a control interface for the terminal, and to move the viewpoint from a current location to the location of a destination object gradually via a series of intermediate locations and with a speed which is progressively reduced as the destination object is approached, and
  ii) to move the direction of gaze of the viewpoint from the destination object towards another object in the environment, in response to a further control input made by the user during flight of the viewpoint, and at the same time, in response to the said further control input, to make a discontinuous reduction in the speed of travel in addition to the progressive reduction associated with the approach to the destination object.

11. A method of controlling a data terminal comprising:

generating a display of a three-dimensional environment which includes a plurality of objects which correspond to different data sources;

moving the apparent location of the viewpoint in the environment, in response to a control input from the user, from a current location to the location of a destination object gradually, via a series of intermediate locations, and with a speed which is progressively reduced as the destination object is approached;

orienting the direction of gaze of the viewpoint away from the destination object towards another object in the environment in response to a further control input made by the user during flight of the viewpoint; and at the same time, in response to the said further control input, making a discontinuous reduction in the speed of travel in addition to the progressive reduction associated with the approach to the destination object.

* * * * *